E. J. RICH.
SPOOL UNWINDER.
APPLICATION FILED APR. 24, 1908.
909,456.
Patented Jan. 12, 1909.
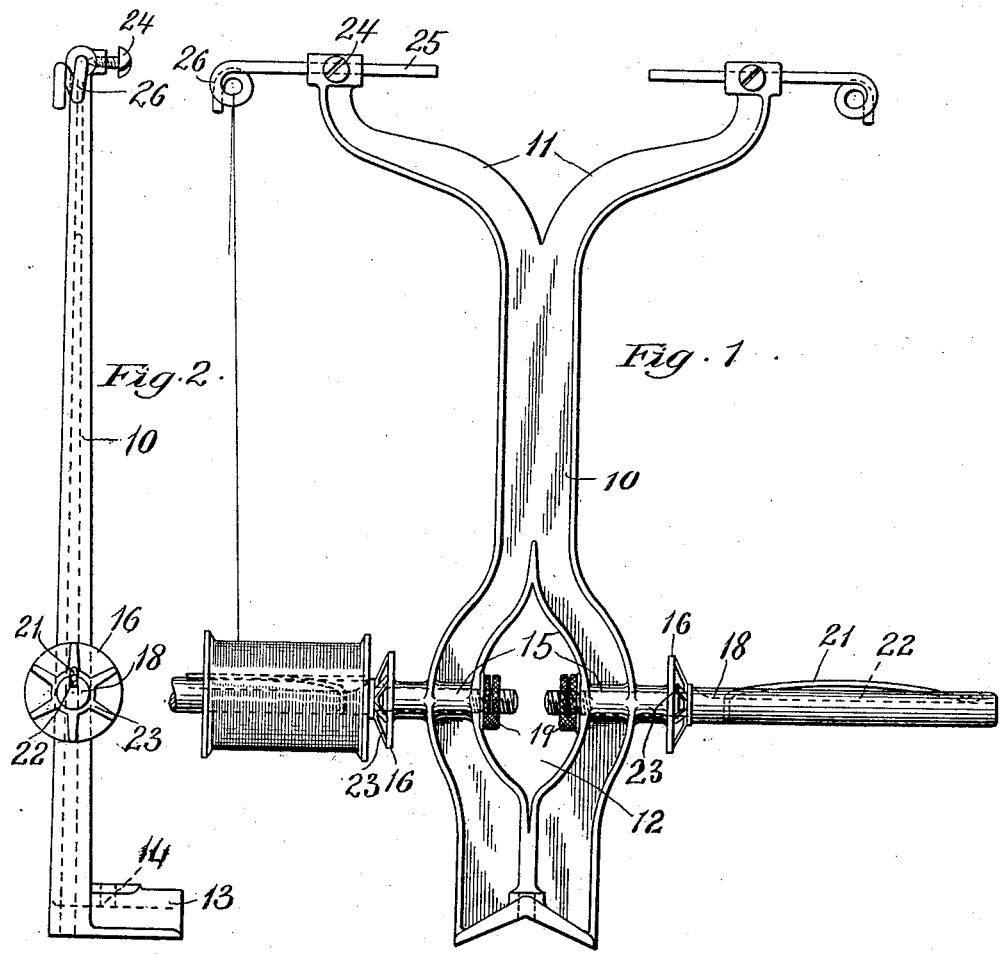
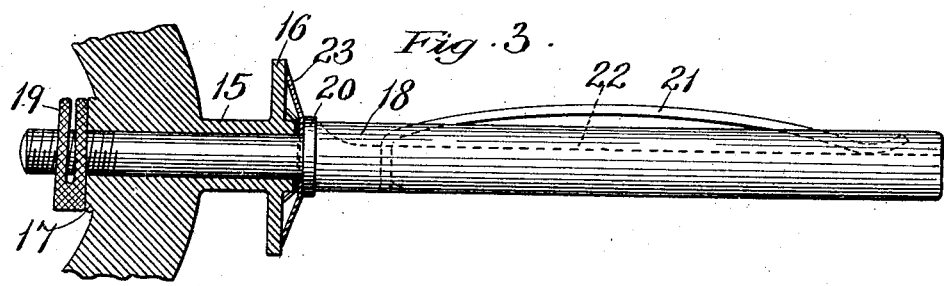
Witnesses:
Inventor:
Evelyn James Rich

UNITED STATES PATENT OFFICE.

EVELYN JAMES RICH, OF EAST HAMPTON, CONNECTICUT, ASSIGNOR TO SUMMIT THREAD COMPANY, OF EAST HAMPTON, CONNECTICUT, A CORPORATION OF MAINE.

SPOOL-UNWINDER.

No. 909,456.      Specification of Letters Patent.      Patented Jan. 12, 1909.

Application filed April 24, 1908. Serial No. 429,101.

*To all whom it may concern:*

Be it known that I, EVELYN JAMES RICH, of East Hampton, in the county of Middlesex and State of Connecticut, have invented certain new and useful Improvements in Spool-Unwinders, of which the following is a specification.

This invention relates to supports used for the thread spools employed on sewing machines, and one of the objects of my present invention is to provide an attachment capable of being applied to any machine, and which will enable the tension on the thread spool to control the unwind of the thread to be adjusted in a simple manner, and whereby the tension after adjustment will be uniform.

To these ends the invention consists in the construction and combination of parts substantially as hereinafter described and claimed.

Of the accompanying drawings in which similar reference characters indicate the same or similar parts in all the figures, Figure 1 is an elevation of an attachment complete showing my invention in the preferred embodiment. Fig. 2 is a side elevation of the same. Fig. 3 is a detail, partially in section and on an enlarged scale, of one of the spool spindles and its support in the attachment bracket.

The frame or bracket 10 of the attachment is formed with arms 11 at its upper end and with an opening 12 near its base. The bracket is formed with a foot piece 13 having a hole 14 for a screw, by means of which the bracket may be secured to the arm of a sewing machine. The bracket is formed with bearings 15 in alinement with each other on opposite sides of the opening 12, portions of the metal extending outward on each side to form a tubular projection terminating in a disk or flange 16 which, as shown, is preferably integral with the material of the frame or bracket. At the inner end of the bearing, a flat face 17 is formed for a purpose presently described.

In each bearing 15, a spool spindle 18 is rotatably mounted, the inner end of said spindle being screw-threaded and provided with a nut 19. This nut, as illustrated, is partially split transversely so that it can be distorted to cause it to bind on the threads of the spindle, and retain its adjustment thereon. Each spindle is also formed with a collar 20 which is normally located a slight distance away from the outer end of the bearing 15. A friction spring 21 is mounted in a groove 22 of the spindle, being secured at one end and free at the other end and bowed outward between its ends so as to frictionally engage the bore of the spool, said spring being placed on the spindle, said spring being designed to have sufficient strength to prevent the spool from rotating on the spindle and to also retain the spool in whatever position it may be placed longitudinally of the spindle.

A spider 23 having spring arms is mounted on the spindle between the collar 20 and the adjacent end of the bearing 15, the arms of said spider bearing against the outer face of the disk 16. By forcibly manipulating the nut 19 so as to draw the spindle inward, the bearing of the arms of the spider on the disk may be increased, resulting of course in increasing the friction between the central portion of the spider and the face of the collar 20 which bears against it. Therefore said nut provides for a convenient variation of the friction which tends to hold the spindle and the spool thereon from revolving to permit the unwinding of the thread, and said adjusting means and friction devices insure uniformity of the tension when the desired adjustment has been obtained.

The upper ends of the arms 11 of the bracket are formed with bearings 24 which adjustably receive wires 25 having guide-eyes 26. The adjustment of the wires 25 enables the eyes 26 to be located in proper position relatively to the spools whatever the size of the latter that are mounted on the spindles.

I claim:—

1. A thread-spool support comprising a spindle having means for frictionally holding a spool thereon and having a collar, a spindle bearing having a disk, a yielding friction member interposed between the collar and disk, and means for adjusting the spindle longitudinally to vary the compression of the friction member.

2. A thread-spool support comprising a spindle having means for frictionally holding a spool thereon and having a collar, a spindle bearing having a disk, a spring spider interposed between the collar and disk, and means for adjusting the spindle longitudinally to vary the compression of said spider.

3. A thread-spool support comprising a spindle having means for frictionally holding a spool thereon, a frame having a bearing for said spindle, the inner end of the spindle being screw-threaded, and a transversely divided nut mounted on the threaded end of the spindle.

4. A spool-supporting attachment for sewing machines, comprising a bracket having bearings, spool spindles mounted rotatably in said bearings, said spindles having means for frictionally holding spools thereon, and means for frictionally retarding rotation of said spindles.

5. A spool-supporting attachment for sewing machines, comprising a bracket having arms at its upper end, thread guides adjustably supported by said arms, the bracket having an opening formed with bearings on opposite sides of said opening, spindles having means for frictionally holding spools thereon and rotatably mounted in said bearings, and means for frictionally retarding rotation of said spindles.

6. A spool-supporting attachment for sewing machines comprising a bracket having arms at its upper end, thread guides adjustably supported by said arms, the bracket having an opening and formed with bearings on opposite sides of said opening, spindles having means for frictionally holding spools thereon and rotatably mounted in said bearings, and means for frictionally retarding rotation of said spindles, said means comprising collars on the spindles, fixed disks supported by the bracket, spring spiders interposed between the collars and disks, and means for adjusting the spindles longitudinally of the bearings to vary the compression of the spiders.

In testimony whereof I have affixed my signature, in presence of two witnesses.

EVELYN JAMES RICH.

Witnesses:
   FRED H. BARTON,
   CLAYTON D. BARTON.